(12) United States Patent
Fischer et al.

(10) Patent No.: US 8,628,851 B2
(45) Date of Patent: Jan. 14, 2014

(54) METHOD FOR ENCAPSULATING A LIQUID

(75) Inventors: Sabine Fischer, Mierlo (NL); Hartmut Rudolf Fischer, Mierlo (NL); Jacobus Eversdijk, Den Bosch (NL); Renz Jeroen Van Ee, Houten (NL)

(73) Assignee: Nederlandse Organisatie Voor Toegepast-Natuurwetenschappelijk Onderzoek TNO, Delft (NL)

( * ) Notice: Subject to any disclaimer, the term of this patent is extended or adjusted under 35 U.S.C. 154(b) by 114 days.

(21) Appl. No.: 11/884,731

(22) PCT Filed: Mar. 6, 2006

(86) PCT No.: PCT/NL2006/000114
§ 371 (c)(1),
(2), (4) Date: Feb. 6, 2008

(87) PCT Pub. No.: WO2006/096051
PCT Pub. Date: Sep. 14, 2006

(65) Prior Publication Data
US 2008/0166556 A1   Jul. 10, 2008

(30) Foreign Application Priority Data
Mar. 7, 2005 (EP) .................. 05075552

(51) Int. Cl.
*B29C 39/10* (2006.01)
*B32B 25/02* (2006.01)
*A61K 9/16* (2006.01)

(52) U.S. Cl.
USPC ............ 428/402.21; 264/4; 264/4.6; 264/4.7; 264/5; 428/402.2; 424/490; 424/489; 424/491

(58) Field of Classification Search
USPC ............... 428/402–402.24; 264/4–4.79, 534; 424/489, 408
See application file for complete search history.

(56) References Cited

U.S. PATENT DOCUMENTS

| 3,816,169 A * | 6/1974 | Vassiliades et al. ....... 428/313.5 |
| 6,969,530 B1 * | 11/2005 | Curtis et al. .................. 424/489 |
| 2002/0048606 A1 * | 4/2002 | Zawistowski ................ 424/489 |
| 2003/0118822 A1 * | 6/2003 | Jahns et al. ................ 428/402.2 |

FOREIGN PATENT DOCUMENTS

| DE | 101 00 689 | 7/2002 |
| WO | 88/10150 | 12/1988 |

OTHER PUBLICATIONS

International Search Report mailed May 18, 2006.

* cited by examiner

*Primary Examiner* — James J Seidleck
*Assistant Examiner* — S. Camilla Pourbohloul
(74) *Attorney, Agent, or Firm* — Nixon & Vanderhye P.C.

(57) ABSTRACT

The invention provides a method for encapsulating a liquid, which method comprises the steps of providing a suspension of droplets of the liquid to be encapsulated; stabilizing the suspension of droplets with a surfactant; adding a layered inorganic material to the stabilized suspension; and subjecting the suspension to a treatment which establishes that a shell of a hybrid material is formed around the droplets, which hybrid material comprises at least part of the inorganic material and at least part of the surfactant. The invention further provides encapsulated liquid droplets obtainable by said method.

10 Claims, 2 Drawing Sheets

METHOD FOR ENCAPSULATING A LIQUID

Figure 1A:
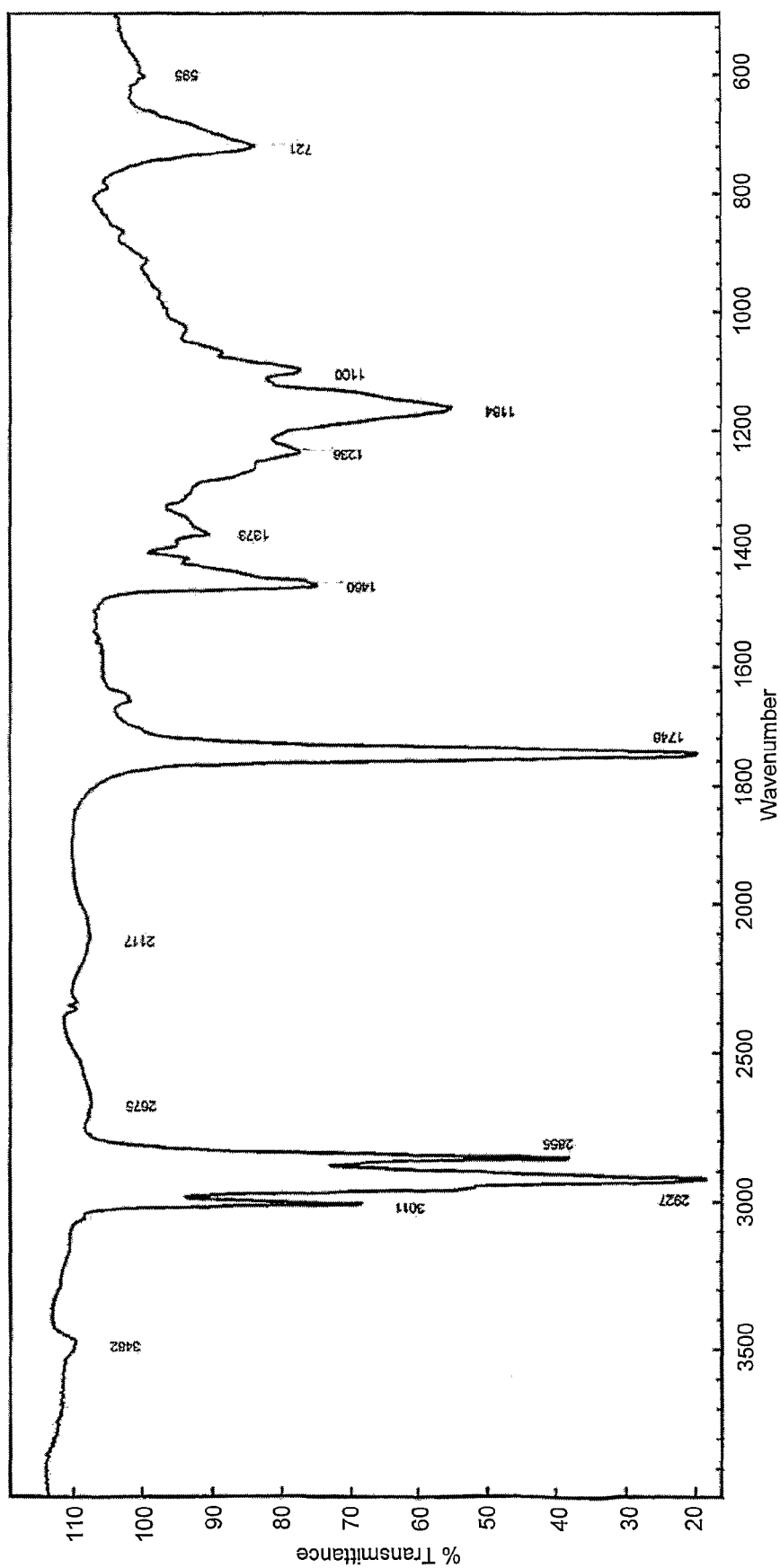

This application is the U.S. national phase of International Application No. PCT/NL2006/000114 filed 6 Mar. 2006 which designated the U.S. and claims priority to 05075552.9 filed 7 Mar. 2005, the entire contents of each of which are hereby incorporated by reference.

The present invention relates to a method for encapsulating a liquid and to encapsulated liquid droplets obtainable by said method.

Encapsulation is a technique which is nowadays increasingly used to establish protection, stabilization and controlled release of sensitive materials such as heat, light, moisture or oxygen sensitive ingredients, in particular sensitive pharmaceutical ingredients and food ingredients. Such sensitive ingredients can be either in solid form or in liquid form.

The capsules of which the coating around the sensitive ingredient is made generally contain organic, polymeric materials such as, for example, biopolymers such a carbohydrates, cellulose, gum, lipids and proteins. Such materials, however, do not provide sufficient protection of the sensitive ingredients against oxygen, heat and water. Moreover, capsules of these materials display only a limited life-time which makes them unsuitable for long storage and slow release applications. Hence, there is a demand to develop an encapsulation process which solves the above-described problems of insufficient protection and limited life-time which are associated with conventional encapsulation materials.

Object of the present invention is to provide a process that enables an improved encapsulation of sensitive liquid ingredients in terms of long storage and slow release applications.

Surprisingly, it has now been found that this can be established if the encapsulation material comprises a hybrid material which comprises a surfactant and a layered inorganic material.

Accordingly, the present invention relates to a method for encapsulating a liquid, which method comprises the steps of:
(a) providing a suspension of droplets of the liquid to be encapsulated;
(b) stabilizing the suspension of droplets with a surfactant;
(c) adding a layered inorganic material to the stabilized suspension obtained in step (b); and
(d) subjecting the suspension obtained in step (c) to a treatment which establishes that a shell of a hybrid material is formed around the droplets, which hybrid material comprises at least part of the inorganic material and at least part of the surfactant.

In accordance with the invention a method is provided which is simple and easy to perform, and which provides encapsulated liquid droplets with very attractive properties in terms of shell-life and controlled release.

A further advantage of the present invention is the fact that an encapsulated liquid is brought in the form of a "powder", enabling improved handling, storage and dosage-ability when compared with the non-encapsulated liquid, which is especially of importance to pharmaceutical and food ingredients but also for functional additives and fillers to be used in plastics. In this way, it can advantageously be established that particular pharmaceutical or food ingredients are released in a later stage of the intestinal tract, for example, in the small intestine or large intestine. In addition, the present invention provides functionalities such as release-on-demand, whereby the release can be triggered by, for example, chemical stimulation, change of pH, change of ionic strength of any suspension medium, piezo activation, magnetically or thermally, by curie point addressing, by light activation, and combinations thereof and many more. Suitable applications include the encapsulation of temperature, light and oxygen sensible organic substances and drugs but also the encapsulation of reactive organic substances which have to be delivered at a certain time and at a certain place, where the required reaction has to be performed (on-demand) and many more. Another application is a release on pressure application whereby the encapsulated liquid is released by tearing the capsule by way of pressure application. A suitable application is, for instance, the encapsulation of epoxy which can be released upon compression forces to react as glue with the surfaces surrounding the capsule. Yet in another application the encapsulated liquid is used for self-healing applications. This can be established by incorporation of encapsulated reactive monomers or oligomers into a polymeric or even an inorganic matrix, like concrete and where the reactive liquid upon release will fill cavities formed within the matrix during failure or cracking. Accordingly, the present invention also relates to a self-healing matrix composition which comprises a matrix into which an encapsulated liquid is embedded, which liquid is encapsulated using the method according to the present invention.

The present capsules prepared in accordance with the present invention can also be attractively used to mask undesired odors or tastes.

The liquid to be encapsulated by means of the present invention can be chosen from a large group of liquids. Suitable liquids include those that can be applied in pharmaceutical, cosmetic and food applications. Suitable examples include unsaturated oils and similar liquids, proteins, vitamins and other pharmaceutically active compounds and drugs, and mixtures thereof, reactive, polymerisable liquids like epoxies, acrylates, mixtures thereof and many more others.

The liquid to be encapsulated can be a hydrophilic liquid or a hydrophobic liquid.

Preferably, the liquid to be encapsulated comprises a hydrophobic liquid.

In step (a) of the method according to the present invention a suspension of droplets of the liquid to be encapsulated is provided. This can be established in various manners known to the skilled person. Suitable methods to provide said suspension include rapid and/or high speed stirring and mixing, ultra-sonic activation and similar procedures, extrusion and flow through filters and porous materials and combinations thereof and many more procedures.

In step (b) of the method according to the present invention the suspension of droplets is stabilized with a surfactant.

Preferably, the surfactant is chosen from the group consisting of anionic, cationic or non-ionic surfactants, and ampholytes.

Suitable anionic surfactants include carboxylates, phosphates, sulphonates and lactates. Preferably, the anionic surfactant comprises one or several acidic groups as the acid or as a salt. Suitable cationic surfactants include amino and ammonium, phosphonium and sulfonium compounds. Preferably, the cationic surfactant comprises one or more cationic groups, either as amine, phosphine or sulfine or as oniumcations in the form of salts. Suitable non-ionic surfactants include sugars and ethylenoxides. Preferably, the non-ionic surfactant comprises one or more OH-groups and/or one or more ethylene oxide groups. Suitable ampholytes include betaines comparable substances. Preferably, the ampholytes comprises one or more cationic and one or more anionic groups in the same molecule.

Step (b) can suitably be carried out by stirring/mixing of liquid to be encapsulated in presence of the surfactant. Suitably, step (b) can be carried out at a temperature in the range of from 0 to 100° C. Suitably, the surfactant is added to the suspension of droplets under stirring.

In step (c) of the method according to the present invention a layered inorganic material is added to the stabilized suspension as obtained in step (b).

Suitably, the layered inorganic materials is derived from a smectite-like clay mineral, a montmorillonite, a beidellite, a nontronite, a hectonite, a saponite or a mineral of the class of layered double hydroxides. Suitable layered double hydroxides include hydrotalcites and similar compounds. Additionally, magnetically addressable nanoparticles may be incorporated into the shell of the capsule, which may be later addressed to open the capsule by magnetic forces and/or to guide the capsule to the place of delivery.

Preferably, the layered inorganic material is derived from montmorillonites or hectorites.

Suitably, step (c) is carried out at a temperature in the range of from 0 to 100° C. Suitably, the layered inorganic material is added to the stabilized suspension under stirring. Preferably, the layered inorganic material is added to the stabilized suspension in the form of a suspension.

Preferably, the layered inorganic material and surfactant to be used have opposite charges.

Preferably, a polymer is added to the stabilized suspension obtained in step (b) before step (c) is carried out. Such a polymer is non-ionogenic or has the same charge as the surfactant used in step (b). Consequently, the shell of hybrid material to be obtained in step (d) will further comprise the polymer. In this way the capsule will obtain an improved mechanical stability and displays an improved protection of the encapsulated liquid against heat, moisture, oxygen and light. Additionally, the chosen polymer may provide the functionality for a triggered release of the encapsulated liquid.

Suitably, the polymer can be present in an amount in the range of from 0.01 to 95 wt %, based on total hybrid material.

The polymer is suitably added to the stabilized suspension in the form of a suspension or solution. Preferably, the polymer is added in the form of an aqueous solution. Suitably, the polymer is added to the stabilized suspension at a temperature in the range of from 0 to 100° C. Suitably, the polymer is added to the stabilized suspension under stirring. The polymer can be a mixture of one or more different types of polymer. Preferably, however, one type of polymer is used. Suitable polymers include polysaccharides such as chitosan, alginate, starch, pectin and proteins like gelatin, casein or whey protein or synthetic polymers. Preferably, the polymer comprises good compatibility with the inorganic component.

In step (d) the suspension obtained in step (c) is subjected to a treatment which establishes that a shell of a hybrid material is formed around the droplets. In one attractive embodiment the treatment in step (d) comprises mixing the suspension obtained in step (c). This can be done by filtration, spay drying, fluid bed-drying and similar procedures. Such a spray-drying step can be carried out in manners known to the skilled person. Suitable temperatures for the spray-drying process are in the range of from 10 to 300° C.

In another attractive embodiment of the present invention, the treatment in step (d) comprises a spray-drying step. In other words, the stabilized suspension as obtained in step (c) is now directly be subjected to a spray-drying step.

The shell of the hybrid material that is formed around the droplets comprises at least part of the layered inorganic material and at least part of the surfactant. Suitably, the weight ration of the inorganic material (A) and the surfactant (B) is in the range of from 0.1/99.9 to 99/1 (A/B), preferably in the range of from 90/10 to 60/40 (A/B).

The present invention further relates to encapsulated liquid droplets that are obtainable by a method according to the present invention, which encapsulated liquid droplets comprise droplets of the liquid around which a shell of a hybrid material is formed, which hybrid material comprises at least a layered inorganic material and at least a surfactant. The present encapsulated liquid droplets display both an improved mechanical stability and an improved protection of the encapsulated liquid against heat, moisture, oxygen and/or other gasses, light, microorganism and enzymes.

EXAMPLES

Example 1

Step 1: A suspension of sunflower oil in water was made by mixing the two components and a surfactant—Tween 80—at room temperature (22° C.) with an ultra turrax (1 w % Tween 80 regarding to the aqueous phase and 10 w % sunflower oil regarding to the total suspension). With a sonification probe a suspension with an average size of the sunflower oil droplets in water of 1-2 micrometer was prepared.

Step 2: An aqueous 10 w % dispersion of synthetic clay—Laponite RDS—was made by adding dry clay powder to demineralized water while stirring with an ultra turrax. After some minutes of stirring a viscous, colourless and clear dispersion was formed.

Step 3: A calculated amount of the clay dispersion (to get the desired relation between clay and aqueous sunflower oil suspension) was added slowly at room temperature to the sunflower oil suspension as obtained in step 1, whilst stirring magnetically.

Step 4: The final suspension as obtained in step 3 was then spray-dried through a single fluid nozzle of a laboratory spray-dry apparatus of "Büchi". The inlet temperature was around 186° C. and the outlet temperature was around 75° C. In this way, a dry white powder was prepared.

Example 2

Step 1: A suspension of sunflower oil in water was made by mixing the two components and a surfactant—Tween 80—at room temperature (22° C.) with an ultra turrax (1 w % Tween 80 regarding to the aqueous phase and 10 w % sunflower oil regarding to the total suspension). With a sonification probe a suspension with an average size of the sunflower oil droplets in water of 1-2 micrometer was prepared.

Step 2: An aqueous 10 w % dispersion of synthetic clay—Laponite RDS—was made by adding dry clay powder to demineralized water while stirring with an ultra turrax. After some minutes of stirring a viscous, colourless and clear dispersion was formed.

Step 3: An aqueous 0.1 w % solution of sodium alginate (as modifier) was made by dissolving the powder in demineralised water while stirring magnetically. The solution was stirred overnight to ensure a complete dissolution of the alginate.

Step 4: To the sunflower oil suspension as obtained in step 1 a calculated amount of the solution of the modifier (0.1 w % modifier regarding to the oil phase) was added slowly while stirring magnetically at room temperature.

Step 5: A calculated amount of the clay dispersion (to get the desired relation between clay and aqueous sunflower oil suspension) as prepared in step 2 was then slowly added to the mixture of the sunflower oil suspension and the modifier as prepared in step 4 at room temperature, while stirring magnetically.

Step 6: Subsequently, the final suspension as obtained in step 5 was then spray-dried through a single fluid nozzle of a laboratory spray-dry apparatus of "Büchi". The inlet temperature was around 186° C. and the outlet temperature was around 75° C. In this way, a dry white powder was prepared.

Example 3

Example 3 was carried out in a similar manner as Example 2, except that in step 3 an aqueous 0.1 w % solution of chitosan was prepared instead of a solution of sodium alginate, which chitosan solution was prepared by dissolving chitosan in water with added acetic acid (pH 6). The solution so obtained was magnetically stirred for 24 hours at room temperature and finally filtrated to delete some insoluble particles.

Example 4

Step 1: A suspension comprising 5 g dematerialized water, 200 micro-liter 1.3 w % Basocoll 8097 solution (polyvinyl amine/amide) and 5 g Epikote 816 LV was prepared by mixing these components at room temperature with a double bladed overhead stirrer. The size of the resulting droplets of the suspension was in-between 5 and 200 micrometer.

Step 2: An aqueous 2 w % dispersion of clay was made by adding dry clay powder (natural sodium montmorillonite from Südchemie Gmbh) to a certain volume of demineralized water while stirring with an ultra turrax. The dispersion was stirred at room temperature overnight.

Step 3: To the 2 w % dispersion of clay as obtained in step 2, an equal volume of methylene blue solution was added containing an amount of methylene blue equal to 1% of the CEC of the clay. The addition was carried out under stirring with an ultra turrax, whilst both mixtures had a temperature of 50° C.

Step 4: To the suspension as prepared in step 1, 2000 µl of the 1 w % clay/methylene blue dispersion as prepared in step 3 was slowly added in portions of 200 µl at room temperature, whilst stirring mechanically. During the addition, a blue coloring of the dispersed Epikote 816 LV was observed. The mixture finally was stirred until a colorless water phase was obtained.

Step 5: Subsequently, fourteen addition cycles as described in step 4 were carried out after each other, whereby in each cycle respectively 200 µl of a 1 w % clay/methylene blue dispersion and then 10 µl of a 1.3 w % Basocoll 8097 solution were added. This resulted in a dispersion of a blue colored dispersed Epikote 816 LV phase in a clear colorless water phase.

Example 5

Step 1: A suspension of Linseed oil in water was made by mixing the two components and a surfactant—Tween 80—at room temperature (22° C.) with an ultra turrax (1 w % Tween 80 regarding to the aqueous phase and 10 w % linseed oil regarding to the total suspension). With a sonification probe a suspension with an average size of the linseed oil droplets in water of around 10 micrometer was prepared.

Step 2: An aqueous 10 w % dispersion of synthetic clay—Laponite RDS—was made by adding dry clay powder to demineralized water while stirring with an ultra turrax. After some minutes of stirring a viscous, colorless and clear dispersion was formed.

Step 3: An aqueous 10 w % solution of gelatin was made by dissolving the powder in demineralised water while stirring magnetically at 40° C. The solution was stirred overnight to ensure a complete dissolution of the gelatin.

Step 4: To the linseed oil suspension as obtained in step 1 a calculated amount of the solution of gelatin (1 w % gelatin regarding to the oil phase) was added slowly while stirring magnetically at room temperature.

Step 5: A calculated amount of the clay dispersion (to get the desired relation between clay and aqueous linseed oil suspension) as prepared in step 2 was then slowly added to the mixture of the linseed oil suspension and the gelatin as prepared in step 4 at room temperature, while stirring magnetically.

Step 6: Subsequently, the final suspension as obtained in step 5 was then spray-dried through a single fluid nozzle of a laboratory spray-dry apparatus of "Büchi". The inlet temperature was around 170° C. and the outlet temperature was around 60° C. In this way, a dry white powder was prepared.

Figure 1B:
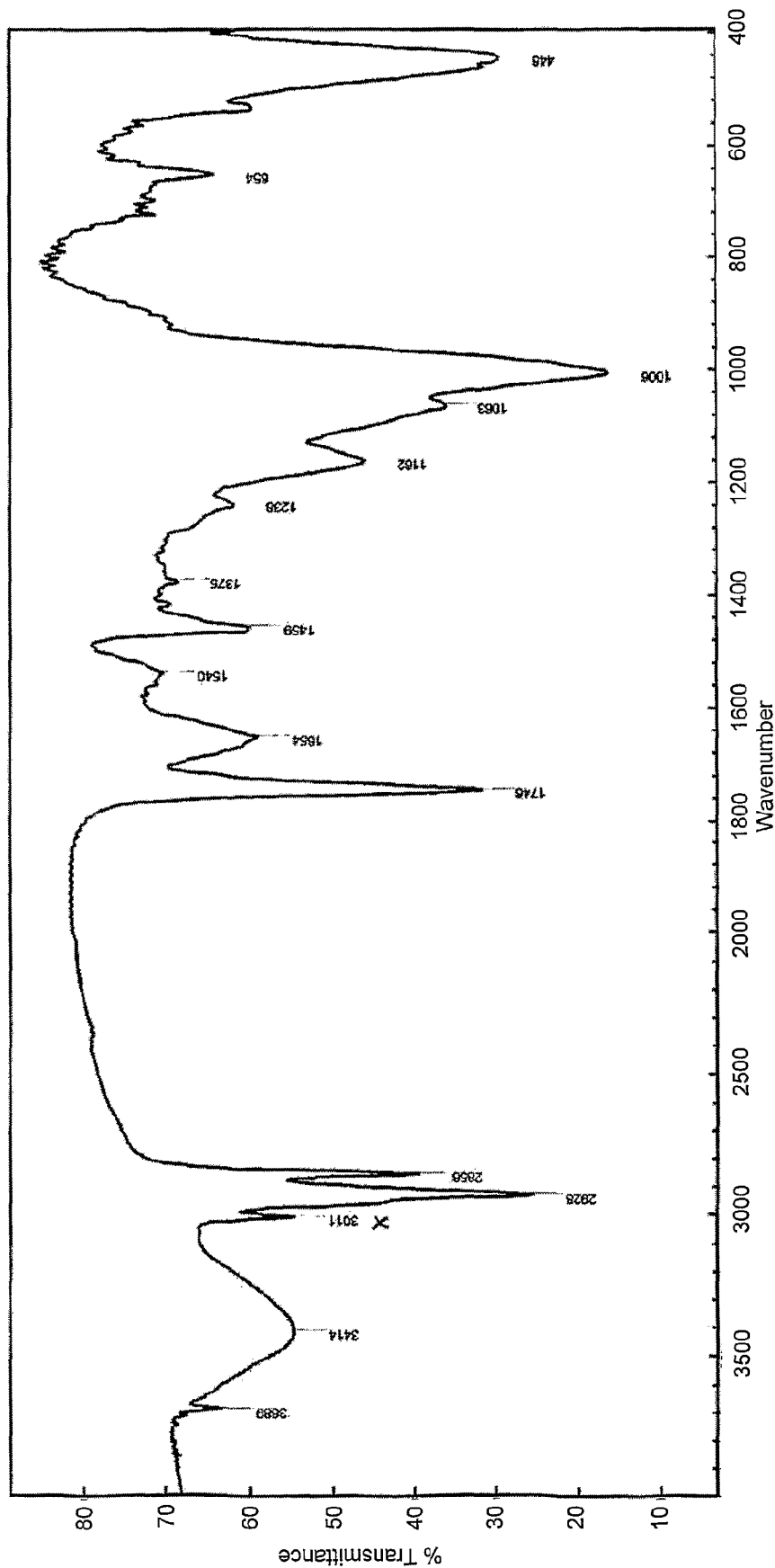

Stability Tests:

The encapsulated linseed oil was investigated by IR measurement to determine the characteristic C=C double bond of linseed oil (unsaturated fat) at 3010 cm$^{-1}$ (see FIG. 1a for pure linseed oil) after spray-drying. This double bond is very reactive and will oxidize under the influence of oxygen, depending on the temperature. The spray-dried powder obtained was analyzed by IR (see FIG. 1b). From FIG. 1b, which shows the curve of the encapsulated linseed oil, it is clear that the characteristic double binding is still present. The conditions of the spray drying process were, moderate enough to avoid and oxidation of the unsaturated fat into a saturated fat.

To evaluate the stability of the hybrid capsule shell consisting of surfactant, clay and gelatin around the linseed oil the powder is cooked under stirring for about an hour. The capsules stayed stable during this experiment and no free fat (linseed oil) could be found on the water surface after finishing the experiment.

The invention claimed is:

1. A method for encapsulating an epoxy, which method comprises the steps of:
   (a) providing a suspension of droplets of the epoxy to be encapsulated;
   (b) stabilizing the suspension of droplets with a surfactant and adding a polymer which is non ionogenic or has the same charge as the surfactant;
   (c) adding a layered inorganic material and magnetically addressable nanoparticles to the stabilized suspension obtained in step (b); and
   (d) subjecting the suspension obtained in step (c) to a treatment which establishes that a shell of a hybrid material is formed around the droplets, which hybrid material comprises at least part of the layered material, at least part of the surfactant, the polymer, and magnetically addressable nanoparticles,
   wherein the shell is capable of protecting the encapsulated liquid against heat, moisture, oxygen and light and the epoxy is released upon compression forces to react as a glue with surfaces surrounding the capsule and wherein the weight ratio of inorganic material (A) and the surfactant (B) is in the range of from 90/10 to 60/40 (A)/(B).

2. A method according to claim 1, wherein the surfactant is selected from the group consisting of anionic, cationic or nonionic surfactants, and ampholytes.

3. A method according to claim 1, wherein the inorganic material is derived from a smectite clay mineral, a montmorillonite, a beidellite, a nontronite, a hectonite, a saponite or a mineral of the class of layered double hydroxides.

4. A method according to claim 1, wherein the treatment in step (d) comprises mixing the suspension obtained in step (c).

5. A method according to claim 1, wherein the mixture obtained in step (d) is spray-dried.

6. A method according to claim 1, wherein the treatment in step (d) comprises a spray-drying step.

7. A method according to claim 1, wherein the layered inorganic material is added to the stabilized suspension in step (c) in the form of a suspension.

8. A method according to claim 1, wherein the polymer is selected from the group consisting of a chitosan, alginate, starch, pectin and protein polymer.

9. Encapsulated liquid droplets obtainable by a method as defined in claim 1, which encapsulated liquid droplets comprise droplets of the epoxy around which a shell of a hybrid material is formed, which hybrid material comprises at least a layered inorganic material and at least a surfactant.

10. Encapsulated liquid droplets according to claim 9, wherein the hybrid material further comprises a polymer.

\* \* \* \* \*

UNITED STATES PATENT AND TRADEMARK OFFICE
CERTIFICATE OF CORRECTION

| | | |
|---|---|---|
| PATENT NO. | : 8,628,851 B2 | Page 1 of 1 |
| APPLICATION NO. | : 11/884731 | |
| DATED | : January 14, 2014 | |
| INVENTOR(S) | : Sabine Fischer et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 264 days.

Signed and Sealed this
Eighth Day of September, 2015

Michelle K. Lee
*Director of the United States Patent and Trademark Office*